US012031344B2

(12) United States Patent
Engel

(10) Patent No.: US 12,031,344 B2
(45) Date of Patent: Jul. 9, 2024

(54) SANITARY INSTALLATION AND ASSOCIATED ANGLED DOOR

(71) Applicant: Hartmut S. Engel, Ludwigsburg (DE)

(72) Inventor: Hartmut S. Engel, Ludwigsburg (DE)

(73) Assignee: Hartmut S. Engel, Ludwigsburg (DE)

( * ) Notice: Subject to any disclaimer, the term of this patent is extended or adjusted under 35 U.S.C. 154(b) by 255 days.

(21) Appl. No.: 17/625,589

(22) PCT Filed: May 27, 2020

(86) PCT No.: PCT/EP2020/064620
§ 371 (c)(1),
(2) Date: Jan. 7, 2022

(87) PCT Pub. No.: WO2021/004687
PCT Pub. Date: Jan. 14, 2021

(65) Prior Publication Data

US 2022/0282507 A1 Sep. 8, 2022

(30) Foreign Application Priority Data

Jul. 9, 2019 (EP) .................................... 19185297

(51) Int. Cl.

| | |
|---|---|
| ***E04H 1/12*** | (2006.01) |
| ***A47K 17/00*** | (2006.01) |
| ***E05F 15/70*** | (2015.01) |
| ***E06B 3/02*** | (2006.01) |
| ***E06B 3/36*** | (2006.01) |

(Continued)

(52) U.S. Cl.
CPC ........... *E04H 1/1266* (2013.01); *A47K 17/00* (2013.01); *E04H 1/1216* (2013.01); *E05F 15/70* (2015.01); *E06B 3/02* (2013.01); *E06B 3/36* (2013.01); *E06B 3/48* (2013.01); *E06B 3/827* (2013.01); *E05Y 2400/44* (2013.01); *E05Y 2900/112* (2013.01)

(58) Field of Classification Search
CPC ..... E04H 1/1266; E04H 1/1216; A47K 17/00; E05F 15/70; E06B 3/02; E06B 3/48; E06B 3/827; E06B 3/36; E05Y 2400/44; E05Y 2900/112
See application file for complete search history.

(56) References Cited

U.S. PATENT DOCUMENTS

| | | | |
|---|---|---|---|
| 4,720,876 | A | 1/1988 | Tomei et al. |
| 2013/0232685 | A1 | 9/2013 | Cornille |

FOREIGN PATENT DOCUMENTS

| | | | |
|---|---|---|---|
| CN | 109208942 | A | 1/2019 |
| DE | 1554348 | A1 | 4/1970 |
| DE | 4400049 | A1 | 7/1995 |

(Continued)

OTHER PUBLICATIONS

International Search Report in International Appl. No. PCT/EP2020/064620, dated Nov. 3, 2020, 4 pages.

(Continued)

*Primary Examiner* — Andrew J Triggs
(74) *Attorney, Agent, or Firm* — Bochner PLLC; Laura A. Harper

(57) ABSTRACT

A sanitary installation is described that comprises at least one sanitary space, which can be closed, and whose pivot door is configured as a double-leaf angled door having a leaf composed of a material that is preferably transparent over its full area and having a leaf composed of an opaque material.

15 Claims, 3 Drawing Sheets

Figure 1:
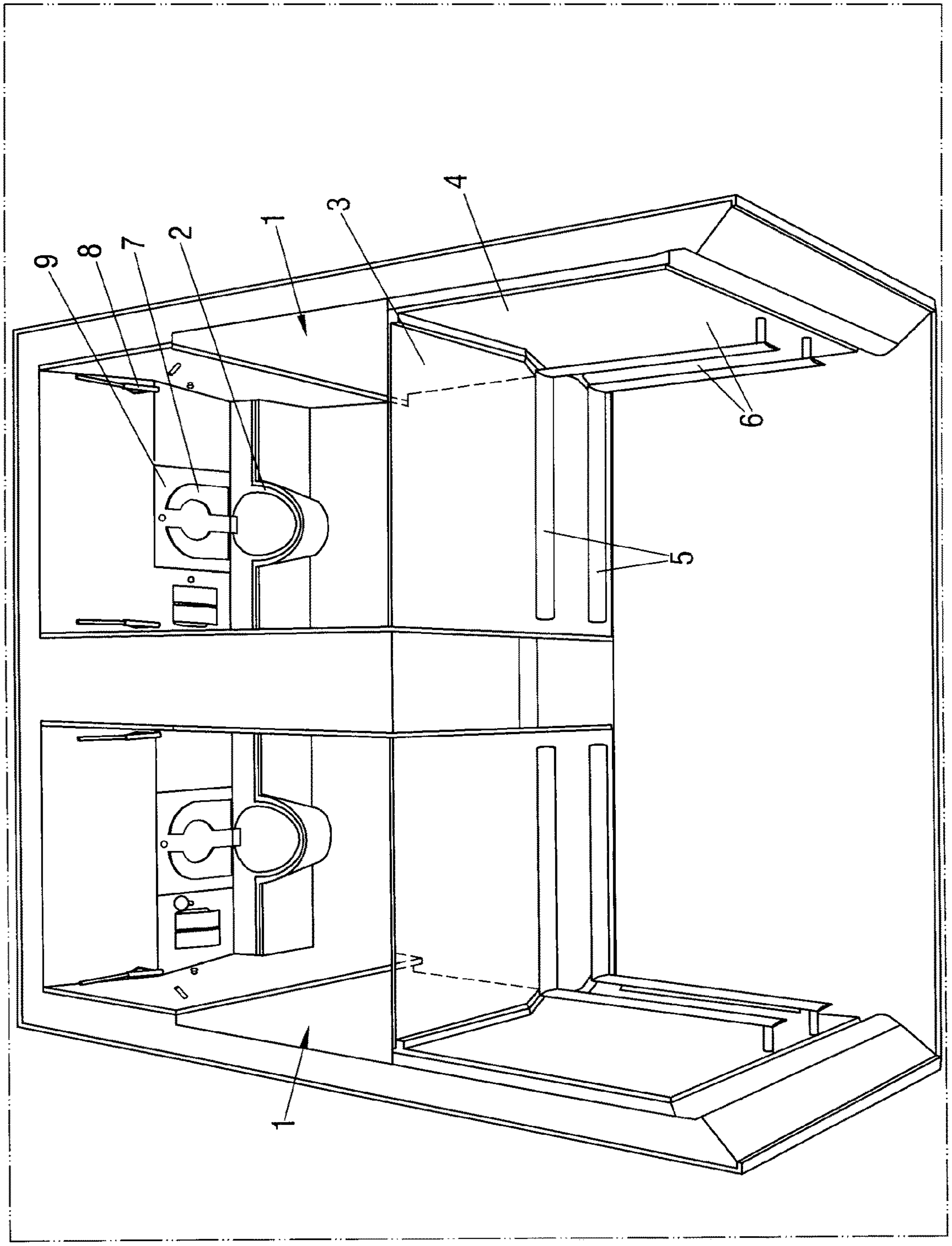

(51) Int. Cl.

| | |
|---|---|
| ***E06B 3/48*** | (2006.01) |
| ***E06B 3/82*** | (2006.01) |

(56) References Cited

FOREIGN PATENT DOCUMENTS

| | | | |
|---|---|---|---|
| JP | S63136188 | U | 9/1988 |
| JP | H03228720 | A | 10/1991 |
| JP | H0589784 | U | 12/1993 |
| JP | H0612657 | U | 2/1994 |
| JP | H08228965 | A | 9/1996 |
| JP | 2004350894 | A | 12/2004 |
| JP | 2008267104 | A | 11/2008 |
| WO | 2008111853 | A1 | 9/2008 |

OTHER PUBLICATIONS

Office Action of the Japanese Patent Office in related Japanese Patent Appl. No. 2022-501133, dated Mar. 5, 2024, 6 pages.

SANITARY INSTALLATION AND ASSOCIATED ANGLED DOOR

The invention relates to a sanitary installation comprising at least one sanitary space that includes the respective sanitary units and that can be closed via a lockable pivot door.

Sanitary installations accessible to the public, such as washrooms and in particular toilet installations, should always be presented as hygienically unobjectionable and also safe places to the users.

However, this is very often not the case, in particular in installations without a supervisor, since users leave the respective location in a more or less soiled state without regard for subsequent users despite corresponding written instructions because they feel unobserved and not obligated to clean, and in fact usually also remain unobserved.

The consequence is that such public installations are entered by users with an uneasy feeling because they do not know before entering a cubicle or sanitary space in what condition they will find the sanitary units and—to make matters worse—they often cannot see whether a person may be hiding behind a door or a door that is only partly open.

All this leads to an overt or subliminal feeling of unease and insecurity among users, which in turn has the result that such public installations are often avoided.

An indoor toilet that should make it possible to judge the hygienic condition of the respective toilet from the outside without having to open the door has already become known from the Internet as "Toilettentür Glas" in Youtube. For this purpose, a self-coloring toilet door composed of glass is provided, wherein this door is transparent when the toilet is not occupied and then, when the toilet is occupied and locked, the glass changes color and becomes opaque. The switching from transparent to opaque is achieved by applying an electrical voltage using associated electronics.

Apart from the fact that this solution is very costly and can thus only be considered for high-quality indoor systems, this solution has the disadvantage that in the event of a fault in the power supply or also in the event of a manipulation at the emergency release accessible from the outside, the door can become transparent and the user can thus get into an embarrassing situation.

A sequence control of curved sliding doors of a sanitary installation designed as a round unit is known from CN 109208942 A.

A wall body for separating cubicle compartments from existing spaces is known from DE 15 54 348 A1, wherein the wall body is provided with doors through which the respective partitioned cubicle compartment is accessible. A cubicle compartment can in this respect consist solely of angled revolving doors that are assembled such that each angled revolving door separates a locker box by its leg within the cubicle compartment. If a revolving door is in this respect pivoted into the open position, the total locker box moves in front of the level of the wall body and is thus easily accessible.

A public toilet installation is known from DE 44 00 049 A1 whose special feature is that it has toilet cubicles that are individually accessible from the outside and that are separated from one another by side and inner walls. In this respect, the respective outer door can be configured as a pivot door or a swing door or as a sliding door.

It is the object of the invention to find a solution for public sanitary installations, and in particular public toilet installations, that eliminates the disadvantages described above and that contributes to making the hygienic standard of such installations verifiable for the user even before entry and, due to the openness and clarity of the installation, to impart a feeling of high security to the users and to emotionally induce the users to maintain the high hygiene standard which they find before entering the sanitary space.

Starting from a sanitary installation of the initially mentioned kind, this object is substantially satisfied in that the pivot door is configured as a double-leaf angled door having a leaf composed of a material that is preferably transparent over its full area and having a leaf composed of an opaque material, wherein the transparent leaf closes the sanitary space including the sanitary units in the unused or free state and the opaque leaf is transferred into the closed position corresponding to the occupied state by pivoting the transparent leaf when the sanitary space is entered.

The idea of replacing the conventional opaque pivot doors with double-leaf angled doors having leaves that are preferably arranged offset from one another at a right angle and that are composed of a transparent material, on the one hand, and of an opaque material, on the other hand, makes it possible in a surprising way to provide simple, robust, and vandal-proof solutions both for outdoor installations and for public toilets in buildings that, irrespective of the effort made for the sanitary units provided in the respective cubicles, contribute towards increasing or guaranteeing hygiene and safety in such installations through transparency and the avoidance of spatial regions that are difficult or impossible to see.

Since a climatically closed sanitary space is always produced or present due to the solution in accordance with the invention, access to this space can take place directly. The otherwise necessary anteroom is thereby omitted.

The sanitary space, which is always illuminated in the required manner, can already be seen from a distance through the transparent door leaf, which significantly improves the feeling of being able to control the local situation well, in particular at night and, for example, in lonely parking spaces.

The sanitary space can thus be checked before entering with regard to its condition or with regard to the cleanliness and the respective user is then also clearly aware that the space is immediately fully visible or visible again after leaving. This "social control" forces the user to leave the space in a perfectly clean condition.

A particularly advantageous embodiment of the invention is characterized in that the operating elements for pivoting, locking, and unlocking the angled door are only provided at the mutually facing inner surfaces of both leaves, wherein the operating elements are in particular configured as body-related operating strips, i.e. operating strips that can in particular be actuated by means of the hip, the thigh or the foot and that are preferably arranged in the region of the lower third of the leaves.

The practical significance of these features becomes particularly clear when one realizes that in known sanitary installations in which doors with normal handles are used, in the simplest case, i.e. in the case of an entrance door to the anteroom with a washbasin, a door to the separate ladies'/gentlemen's areas and a cubicle door, at least eleven hand contacts with the door handles and locking knobs are necessary if these doors are opened and closed via the handle and the locking knobs are actuated when entering and leaving in each case. Even after washing hands, the last two hand contacts at the entrance door are usually still required.

Even if the space doors are automated, the cubicle door alone still requires six hand contacts, namely opening the door with the handle, closing the door with the handle, closing the lock, opening the lock, opening the door with the handle, and closing the door with the handle.

If one takes into account that the door handles are always known to be the most highly contaminated with germs, i.e. also considerably more than toilet seats, then it is conceivable how high the risk of germ transmission is with the known installations.

In contrast, in the case of the pivot door in accordance with the invention with the body-related operating elements in the form of the hip, the thigh or the foot, the transparent door is practically taken along by the person entering in each case and automatically closes the second opaque leaf behind it. Neither a single hand contact nor an awkward "elbow operation", as is often practiced, is therefore necessary. An absolutely effective protection against germ transmission is thus achieved by the invention both when entering and when leaving the sanitary space.

In principle, all types of known materials can be used for the opaque leaf, but stainless steel is preferably used to implement high-quality solutions. The transparent leaf is preferably composed of clear glass.

In accordance with a further embodiment variant of the invention, the angled door can also be connected to an automatic drive that can be triggered by actuation elements and/or sensors and that can be decoupled for a possibly desired transition to a purely mechanical operation of the door. In this case, the rotary movement of the angled door can smoothly adapt to the person entering, as is known from such drives. In practice, the mechanical operation is preferred that has the familiar aspect of emotional security for the user. Furthermore, the two leaves of the angled door can be designed such that they can be decoupled from one another in particular in the event of an emergency.

A further essential and preferably also used aspect of the invention consists therein that the transparent leaf is used as a control and actuation member for at least one sensor that is associated with the position of the transparent leaf in its locked state and that in particular controls illumination, cleaning, flushing, and/or drying processes in the cubicle.

This use of the transparent leaf as a control member also makes it possible, for example, to catch up on a forgotten flush and to trigger disinfection processes and the like.

In accordance with a further embodiment of the invention, a cleaning and drying station, in particular a visible cleaning and drying station, is provided for the toilet seat of a toilet provided in the cubicle, said cleaning and drying station receiving the toilet seat in the raised position and, just like the pivot movement of the toilet seat, being controlled in dependence on the position of the transparent leaf.

A further advantageous special feature of the invention consists therein that, for unisex use without an anteroom or with a common anteroom, each sanitary space is designed as a climatically closed unit sanitary space that is visibly directly accessible to every user.

Since a directly accessible, initially fully visible individual sanitary space that is securely closed after entering is available for use to each operator, gender segregation can be convincingly dispensed with. This gender segregation is always necessary when both regions, assigned to ladies and gents respectively, have to be divided by a common, closed anteroom situation or even two larger toilet installations separated by gender are to be provided. The directly accessible unisex solution in accordance with the invention allows several small unisex groupings in a decentralized manner for a comparable total number of toilet cubicles, said unisex groupings then also having a better use since a more uniform utilization is possible.

The aspect of increasing the capacity of sanitary installations plays a significant role in practice. At large events, such as those held in football stadiums, at theater or concert performances and the like, where there is a demand for many uses in a short period of time, the toilets are usually not suitable for the gender distribution of the visitors if a very large number of visitors visit the toilets at the same time, in particular during breaks.

Due to the gender-neutral possibility of use, unisex spaces designed in accordance with the invention have a significantly higher capacity through the equal possibility of use irrespective of gender.

This also applies to airports, railway stations, schools, to visitors to hospitals, shopping centers, hotels and the like, and naturally also in inner-city areas for decentralized smaller one- to two-space systems.

Even when assuming the same number of toilet cubicles of a conventional arrangement, due to the elimination of the gender-segregated areas and of the anterooms that are thereby possibly dispensed with, considerably less building volume is required or a higher number of unisex spaces designed in accordance with the invention of significantly increased capacity are possible with the same available building volume.

The subject of the invention is also generally the use of an angled door comprising two leaves, which are arranged substantially at a right angle to one another, as a pivotable end for sanitary and toilet spaces, in particular public sanitary and/or toilet spaces, wherein one leaf is in particular composed over its full area of a transparent material, preferably glass, and the other leaf is composed of an opaque material, preferably stainless steel. The two leaves arranged at a right angle can be decoupled at their fixed angular positions in particular in the event of an emergency.

Further details and advantages of the invention will be explained with reference to the following description of an embodiment example and to the drawing.

Figure 2:
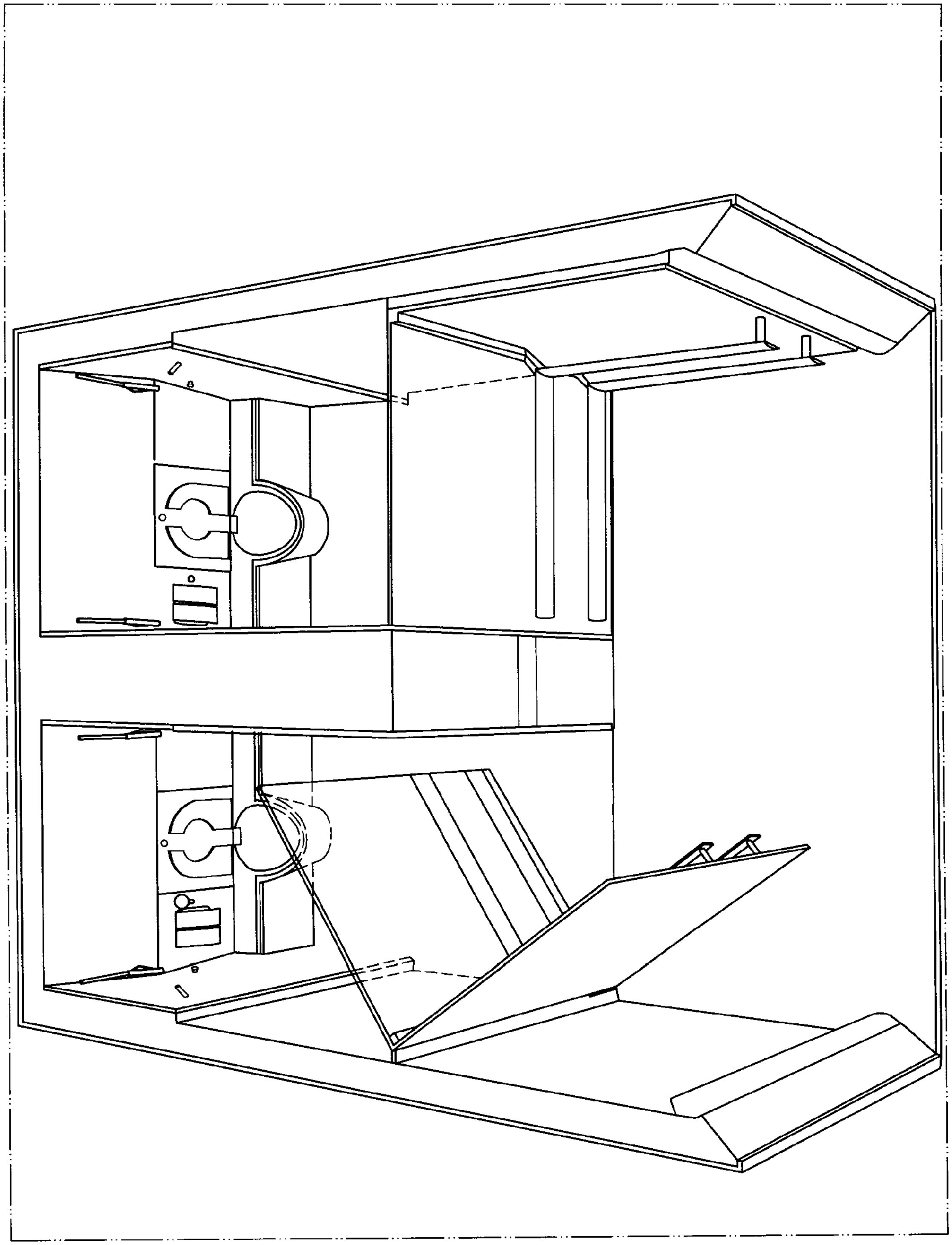
Figure 3:
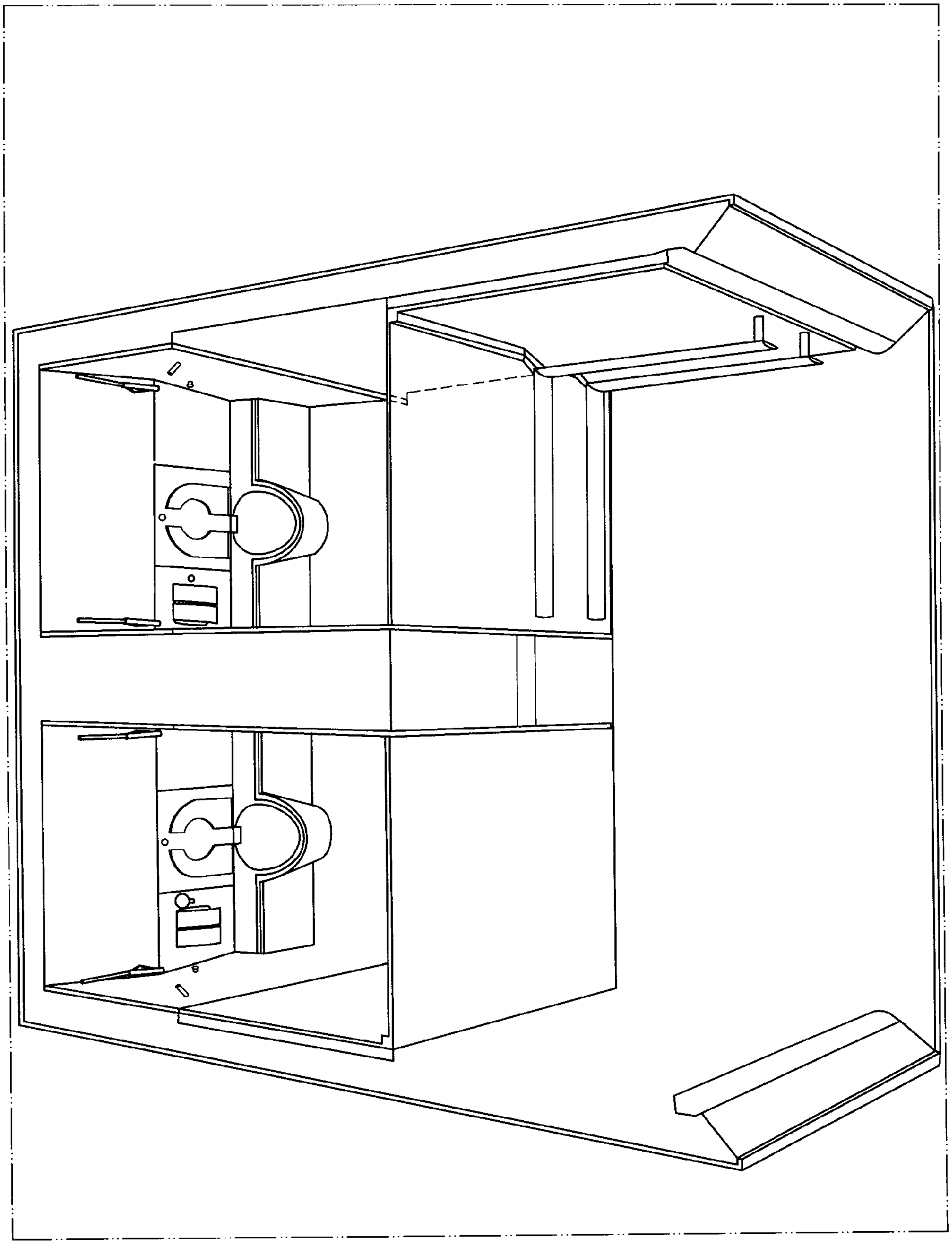

There is shown in the drawing:

FIG. 1 a schematic representation of a toilet installation in accordance with the invention comprising two sanitary spaces, wherein both spaces are shown in the free state, i.e. the unused state;

FIG. 2 the installation in accordance with FIG. 1, wherein in the left sanitary space the angled door is shown in the transition from the free state to the occupied state, i.e. in the state in which a person enters the room; and FIG. 3 the system in accordance with FIG. 1, wherein the left sanitary space is shown in the occupied state and the right sanitary space is shown in the free state.

In conventional public toilets or toilet installations, there is the fundamental problem that, on the one hand, many users are not prepared to clean the toilet in the respective required manner after use and to leave the space in a hygienically unobjectionable condition and that, on the other hand, such installations are often confusing due to doors that are sometimes closed or only partly open in the unused state and a user must fear that a person is hiding in the space behind a door.

All this leads to the fact that the hygienic-aesthetic condition in these installations often leaves something to be desired and a subliminally uneasy feeling of insecurity can come over users when visiting such an installation.

The sanitary installation in accordance with the invention, such as is shown in FIG. 1, enables the user to see at a glance whether the cubicles are aesthetically clean and clearly "free", whereby the current hygienic-aesthetic condition is no longer a secret and a subliminally uneasy feeling of insecurity can no longer arise.

Each sanitary space 1 of the installation, in which there is at least one toilet 2, which comprises a toilet seat 7 and preferably a cleaning station 9, and associated equipment such as a paper holder and in particular also a hand-washing basin, is equipped with an angled pivot door in accordance with the invention.

Each of these angled doors comprises a transparent leaf 3 and an opaque leaf 4, wherein the transparent leaf 3 is associated with the free state of the cubicle and the opaque leaf 4 is associated with the occupied state of the cubicle. The transparent leaf is in this respect preferably composed of clear glass; the opaque leaf 4 is composed of stainless steel or another opaque material.

At the mutually facing surfaces of the angled door, actuation elements 5, 6 are provided in the lower region of the respective door, by means of which actuation elements 5, 6 each of the two leaves 3, 4 is locked in the position closing the respective cubicle 1 and can be unlocked from this position.

As FIG. 1 shows, the cubicles are climatically sealed by the glass leaf in the unused state and it is possible to see immediately whether the cubicle or the sanitary space is in a hygienically unobjectionable condition and clean. Furthermore, it is immediately apparent that there are no concealed areas that could give rise to any feelings of insecurity with regard to people who may be hiding.

FIG. 2 shows the case where a person enters the left cubicle 1, i.e. the locking of the glass leaf has been released via the actuation element 5 or the actuation element 6 via hip, thigh or foot contact and the angled door—taken along by the respective person—is pivoted, whereby the passage opening is released by the glass leaf 3 and closed by the following opaque leaf 4 when the person is fully inside the cubicle. The unlocking via the actuation elements 5, 6 and the opening can again take place without using the hands. For this purpose, the actuation and locking elements are arranged in the lower region of the door so that the upper element can, for example, be triggered by the thigh or the lower element can be triggered by the foot or the footrest of a wheelchair.

Alternatively, the opening process can also be triggered automatically without operating elements by a motion sensor. A door movement is likewise possible in an automatic manner, wherein it is, however, in any case ensured that mechanical emergency actuation systems are provided. Thus, it is in particular possible to provide a releasable locking between the two leaves so that a single leaf can be pivoted in particular in the event of an emergency.

FIG. 3 shows the installation in accordance with FIG. 1 with an "occupied" cubicle shown at the left and a cubicle at the right that is indeed likewise closed, but is fully visible and can thus also be clearly checked with respect to the hygiene condition.

In the embodiment example shown in FIGS. 1 to 3, provision is made that after use of the toilet, the flush is triggered via a sensor and the toilet bowl is cleaned with high pressure. The toilet seat 7 is automatically raised into the cleaning position, wherein the cleaning and drying can be triggered immediately in the cleaning station 9 and/or on the opening of the cubicle via the glass leaf 3.

To leave the cubicle 1, the user has to unlock the door lock via the operating elements 5, 6 provided at the metal leaf 4, and indeed preferably again using the hip, the thigh, or the foot. In this case, the door or one of the two leaves can also be used to trigger the flush if the user has forgotten to flush.

If the glass leaf 3 is in the locked position again, further processes can be triggered in the fully visible cubicle that is always illuminated in the dark. For example, an automatic high-pressure floor cleaning can take place which a waiting visitor can also observe without it being possible for him to enter the cubicle since the cubicle is blocked for the cleaning time.

A further possibility to be mentioned is the attachment of movable handles 8 that make it easier for disabled users to use the toilet. These handles 8 are preferably attached at the ceiling side and can be moved from a lateral rest position into the user position located in the region of the toilet, wherein the control can again take place via sensors and the return of the handles 8 to the waiting position can also be controlled via the glass leaf 3.

It should also be mentioned that the states "free" and "occupied" can be indicated by corresponding colored signal elements or lighting elements to also facilitate the orientation for users who are not yet familiar with the door system in accordance with the invention that changes from transparent to opaque and back again.

Even though the installation in accordance with the invention can be designed in particularly high expansion or quality levels depending on the application, it is important to note that all the essential advantages described above are also provided by a simple mechanical solution.

It applies to all the embodiment variants that the respective user is aware when leaving the cubicle that the transparent door immediately provides a view into the cubicle and any waiting visitors can immediately see how the cubicle is currently being left.

This social control inevitably has the result that the user will leave the sanitary space only after careful inspection, i.e. the user will be strongly motivated by this social control to keep and to leave the cubicle in a clean condition in order not to be identified as a "dirty slob".

In conjunction with the avoidance of hand contacts already described above and the reduction in germ transmission associated therewith, this aspect cannot be overestimated in its positive effect, which will lead to improved hygiene in public sanitary installations, for example at railway stations, in shopping centers, in public places, in hotels, restaurants, etc., and could even increase the acceptance of temporarily installed toilets.

REFERENCE NUMERAL LIST

1 cubicle
2 toilet
3 glass leaf
4 metal leaf
5 operating element
6 operating element
7 toilet seat
8 handle
9 cleaning station

The invention claimed is:

1. A sanitary installation comprising at least one sanitary space that includes the respective sanitary units and that can be closed via a lockable pivot door, the sanitary installation comprising the pivot door, wherein the pivot door is configured as a double-leaf angled door having two leaves, a leaf of the two leaves being composed of a material that is transparent and a further leaf of the two leaves being composed of an opaque material, wherein the transparent leaf closes the sanitary space including the sanitary units in the unused or free state and the opaque leaf is transferred into the closed position corresponding to the occupied state by pivoting the transparent leaf when the sanitary space is entered.

2. The sanitary installation in accordance with claim 1, wherein the transparent leaf is transparent over its full area.

3. The sanitary installation in accordance with claim 1, wherein operating elements for pivoting, locking and unlocking the double-leaf angled door are only provided at mutually facing inner surfaces of both of the two leaves.

4. The sanitary installation in accordance with claim 3, wherein the operating elements are configured as body-related operating strips.

5. The sanitary installation in accordance with claim 3, wherein the body-related operating strips are operating strips that are actuatable by means of the hip, the thigh or the foot.

6. The sanitary installation in accordance with claim 3, wherein the body-related operating strips are arranged in a region of a lower third of the leaves.

7. The sanitary installation in accordance with claim 1, wherein the opaque leaf consists of stainless steel and the transparent leaf consists of clear glass.

8. The sanitary installation in accordance with claim 1, wherein the double-leaf angled door is connected to an automatic drive in such a manner that it can be decoupled, said automatic drive being able to be triggered by actuation elements and/or sensors.

9. The sanitary installation in accordance with claim 1, wherein the two leaves of the double-leaf angled door are designed such that they can be decoupled from one another.

10. The sanitary installation in accordance with claim 1, wherein the two leaves of the double-leaf angled door are designed such that they can be decoupled from one another in the event of an emergency.

11. The sanitary installation in accordance with claim 1, wherein the transparent leaf is used as a control and actuation element for at least one sensor that is associated with the position of the transparent leaf in its locked state.

12. The sanitary installation in accordance with claim 11, wherein the transparent leaf controls cleaning, flushing and/or drying processes in the sanitary space.

13. The sanitary installation in accordance with claim 12, wherein, for unisex use without an anteroom or with a common anteroom, each sanitary space is designed as a climatically closed unit sanitary space that is visibly directly accessible to every user.

14. The sanitary installation in accordance with claim 11, wherein a cleaning and drying station is provided for the toilet seat of a toilet provided in the sanitary space, said cleaning and drying station receiving the toilet seat in the raised position and, just like the pivot movement of the toilet seat, being controllable in dependence on the position of the transparent leaf.

15. The sanitary installation in accordance with claim 14, wherein the cleaning and drying station is a visible cleaning and drying station.

* * * * *